US012216944B2

(12) United States Patent
Shekhar et al.

(10) Patent No.: US 12,216,944 B2
(45) Date of Patent: *Feb. 4, 2025

(54) SUB-CLUSTER RECOVERY USING A PARTITION GROUP INDEX

(71) Applicant: Rubrik, Inc., Palo Alto, CA (US)

(72) Inventors: Rohit Shekhar, Sunnyvale, CA (US); Hyo Jun Kim, San Jose, CA (US); Prasenjit Sarkar, Los Gatos, CA (US); Maohua Lu, Fremont, CA (US); Ajaykrishna Raghavan, Santa Clara, CA (US); Pin Zhou, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,541

(22) Filed: Oct. 6, 2023

(65) Prior Publication Data

US 2024/0036773 A1 Feb. 1, 2024

Related U.S. Application Data

(63) Continuation of application No. 17/694,032, filed on Mar. 14, 2022, now Pat. No. 11,822,827, which is a continuation of application No. 17/077,245, filed on Oct. 22, 2020, now Pat. No. 11,294,603, which is a continuation of application No. 15/443,721, filed on Feb. 27, 2017, now Pat. No. 10,852,998.

(60) Provisional application No. 62/299,884, filed on Feb. 25, 2016.

(51) Int. Cl.
*G06F 3/06* (2006.01)
*G06F 11/14* (2006.01)
*G06F 16/00* (2019.01)

(52) U.S. Cl.
CPC ............ *G06F 3/067* (2013.01); *G06F 3/0604* (2013.01); *G06F 3/0641* (2013.01); *G06F 11/1469* (2013.01); *G06F 16/00* (2019.01); *G06F 11/1456* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 7,721,044 B1 | 5/2010 | Chatterjee et al. |
| 8,788,459 B2 | 7/2014 | Patel et al. |
| 10,387,448 B2 | 8/2019 | Xu et al. |
| 10,852,998 B2 | 12/2020 | Shekhar et al. |
| 11,294,603 B2 | 4/2022 | Shekhar et al. |
| 2003/0105716 A1 | 6/2003 | Sutton et al. |
| 2004/0215640 A1 | 10/2004 | Bamford et al. |
| 2006/0136903 A1 | 6/2006 | Childress et al. |
| 2007/0162506 A1 | 7/2007 | Grosman et al. |
| 2010/0332456 A1 | 12/2010 | Prahlad et al. |
| 2013/0339567 A1 | 12/2013 | Carpentier et al. |

(Continued)

*Primary Examiner* — Yaima Rigol
(74) *Attorney, Agent, or Firm* — Holland & Hart LLP

(57) ABSTRACT

Embodiments disclosed herein provide systems, methods, and computer readable media for sub-cluster recovery in a data storage environment having a plurality of storage nodes. In a particular embodiment, the method provides scanning data items in the plurality of nodes. While scanning, the method further provides indexing the data items into an index of a plurality of partition groups. Each partition group includes data items owned by a particular one of the plurality of storage nodes. The method then provides storing the index.

20 Claims, 4 Drawing Sheets

(56) References Cited

U.S. PATENT DOCUMENTS

| | | |
|---|---|---|
| 2014/0149590 A1 | 5/2014 | Mallipeddi et al. |
| 2015/0127625 A1 | 5/2015 | Bulkowski et al. |
| 2015/0339308 A1 | 11/2015 | Vasan et al. |
| 2015/0356161 A1 | 12/2015 | Slavcek et al. |
| 2016/0026684 A1 | 1/2016 | Mukherjee et al. |
| 2016/0132411 A1 | 5/2016 | Jolad et al. |
| 2016/0321142 A1 | 11/2016 | Fang et al. |
| 2016/0350358 A1 | 12/2016 | Patel et al. |
| 2017/0060710 A1 | 3/2017 | Ramani et al. |
| 2017/0097875 A1 | 4/2017 | Jess et al. |
| 2021/0286521 A1 | 9/2021 | Shekhar et al. |
| 2021/0286522 A1 | 9/2021 | Shekhar et al. |

SUB-CLUSTER RECOVERY USING A PARTITION GROUP INDEX

CROSS REFERENCE TO RELATED APPLICATIONS

This application is a continuation of U.S. patent application Ser. No. 17/694,032 by Shekhar et al., entitled "SUB-CLUSTER RECOVERY USING A PARTITION GROUP INDEX," filed Mar. 14, 2022; which is a continuation of U.S. patent application Ser. No. 17/077,245 by Shekhar et al., entitled "SUB-CLUSTER RECOVERY USING A PARTITION GROUP INDEX," filed Oct. 22, 2020; which is a continuation of U.S. patent application Ser. No. 15/443,721 by Shekhar et al., entitled "SUB-CLUSTER RECOVERY USING A PARTITION GROUP INDEX," filed Feb. 27, 2017, now U.S. Pat. No. 10,852,998, issued Dec. 1, 2020; which claims priority to U.S. Provisional Patent Application No. 62/299,884 by Shekhar et al., entitled "SUB-CLUSTER RECOVERY USING A PARTITION GROUP INDEX," filed Feb. 25, 2016; each of which is assigned to the assignee hereof and hereby incorporated herein by reference in its entirety.

TECHNICAL FIELD

Aspects of the disclosure are related to the recovery of data items in a database and, in particular, to recovery of data items on a partition group basis.

OVERVIEW

Embodiments disclosed herein provide systems, methods, and computer readable media for sub-cluster recovery in a data storage environment having a plurality of storage nodes. In a particular embodiment, the method provides scanning data items in the plurality of nodes. While scanning, the method further provides indexing the data items into an index of a plurality of partition groups. Each partition group includes data items owned by a particular one of the plurality of storage nodes. The method then provides storing the index.

In another embodiment, a system is provided having one or more computer readable storage media and a processing system operatively coupled with the one or more computer readable storage media. Program instructions stored on the one or more computer readable storage media, when read and executed by the processing system, direct the processing system to scan data items in the plurality of nodes and, while scanning, index the data items into an index of a plurality of partition groups. Each partition group comprises data items owned by a particular one of the plurality of nodes. The instructions further direct the processing system to store the index.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

In many data storage systems, database storage system in particular, data items are stored across multiple storage nodes. These nodes may be remotely located from one another to provide data redundancy and quicker access from different locations. In some storage arrangements, such as a Cassandra database, ownership of data items is distributed across some or across all of the storage nodes. As such, data items stored on each particular storage node are said to be owned by that storage node. Additionally, some databases feature a concept whereby data is partitioned into groups that may span physical nodes. For instance, one group of data may be stored on four nodes of a physical node cluster. The data in that one group may be considered a single partition group even though it is replicated across the four nodes. These partition groups are called virtual nodes, or vnodes, in a Cassandra database but the concept of partition groups may apply to other database types.

Figure 3:
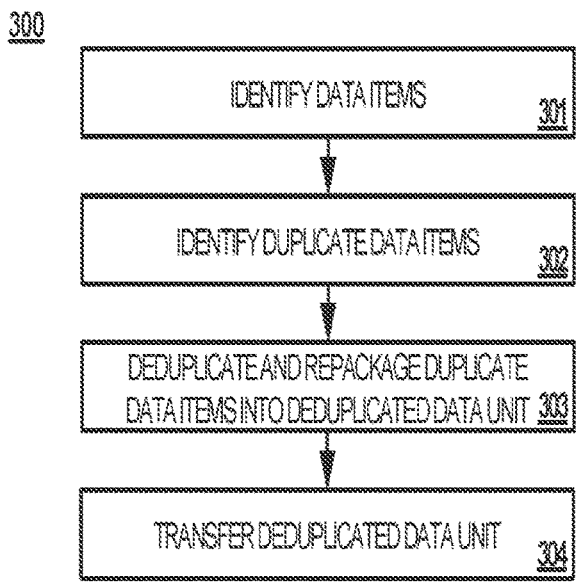
FIG. 3 illustrates a method of operating the computing environment to perform on-the-fly deduplication.
Figure 4:
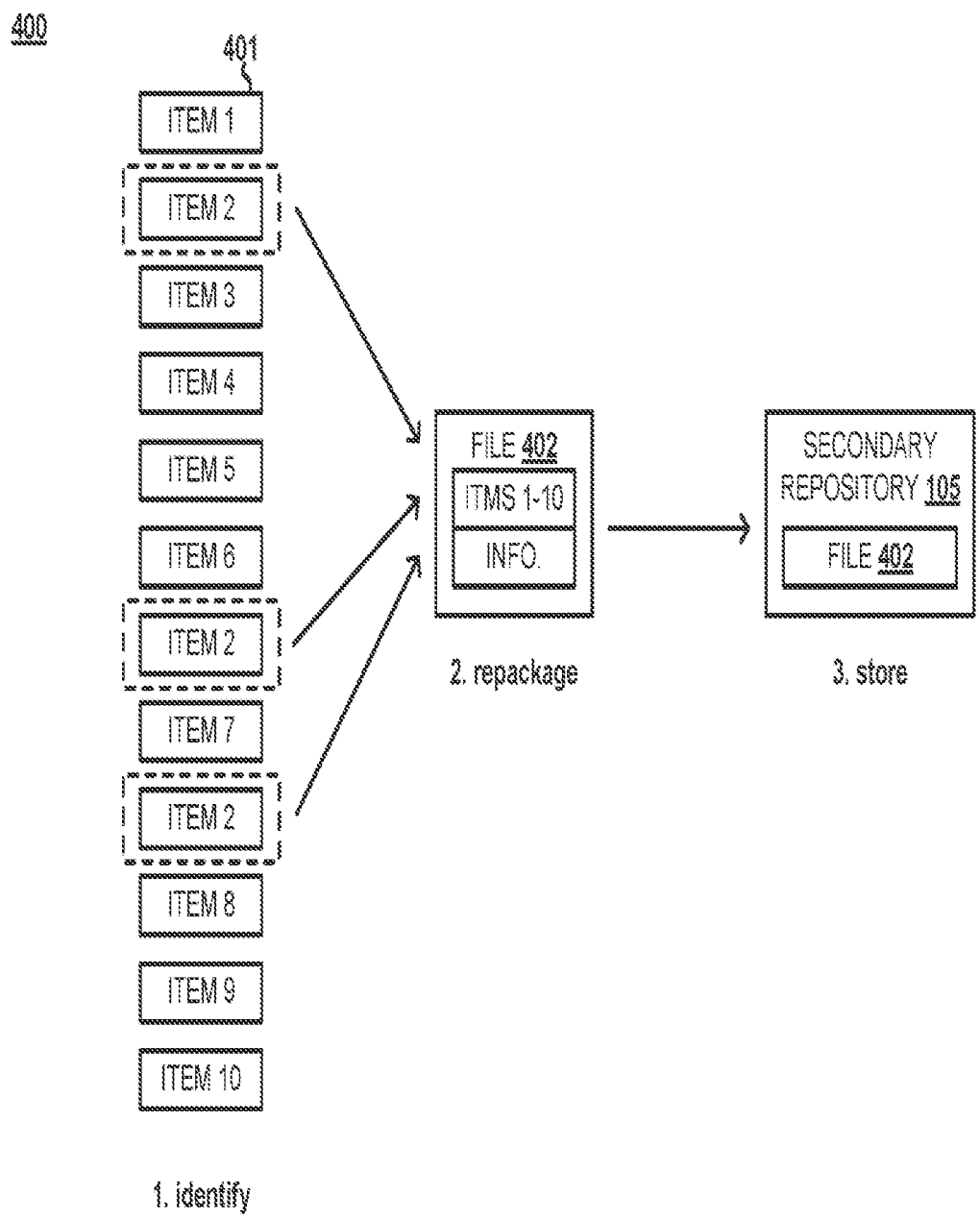
FIG. 4 illustrates a method of operating the computing environment to perform on-the-fly deduplication.

When backing up, versioning, or otherwise capturing the state of the storage nodes in a cluster, storing the data of a particular partition group once allows for deduplication of that data so that the same data is not stored again for each of the storage nodes having a copy of the data. FIGS. 3 and 4 below describes on-the-fly deduplication during data movement in a NoSQL data store and the storage of data in partition groups, as described in FIGS. 1 and 2, is one example of how such deduplication may be achieved.

Figure 1:
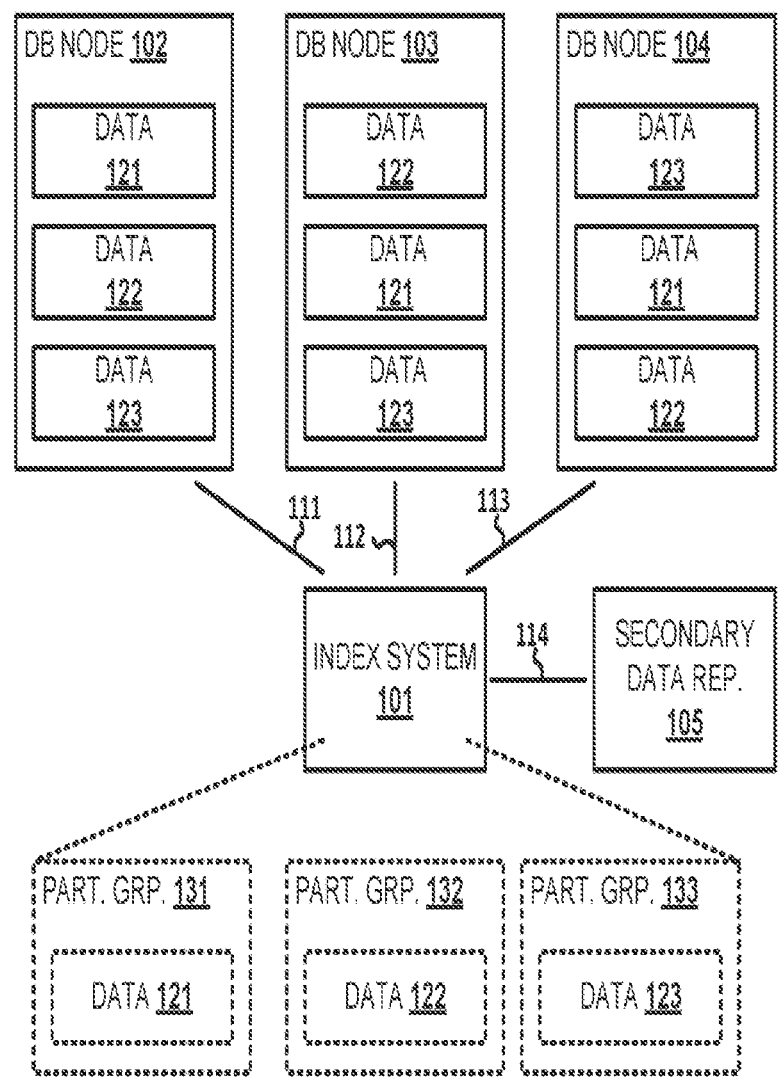
FIG. 1 illustrates a computing environment for sub-cluster recovery using a partition group index.

FIG. 1 illustrates computing environment 100 for sub-cluster recovery using a partition group index. Computing environment 100 includes index system 101, secondary data repository 105, and database nodes 102-104. Index system 101 and database nodes 102-104 communicate over communication links 111-113, respectively. Index system 101 and secondary data repository 105 communicate over communication link 114. In operation, database nodes 102-103 are physical storage systems that implement a distributed database that stores data 121-123. In this example, data 121 is organized as one partition group 131 in the database, data 122 is another partition group 132, and data 123 is another partition group 133. Secondary data repository 105 is used by index system 101 in examples where index system 101 protects data 121-123 by backing it up to secondary data repository 105.

Figure 2:
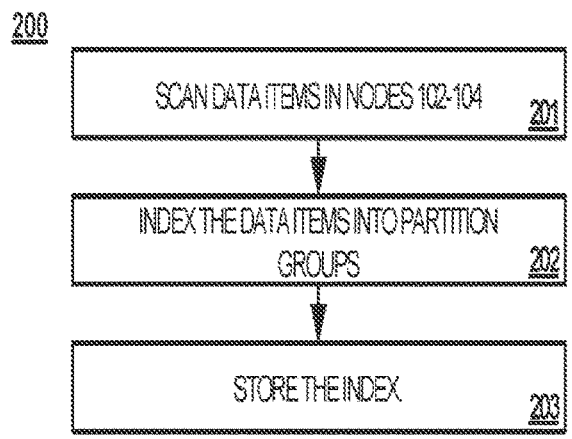
FIG. 2 illustrates a method of operating the computing environment to perform sub-cluster recovery using a partition group index.

FIG. 2 illustrates method 200 of operating the computing environment to perform sub-cluster recovery using a partition group index. Method 200 provides index system 101 scanning data items in the data stored on database nodes 102-104 (201). The scanning may occur at any time. In some cases, the scanning occurs for purposes other than just those described below for method 200. For example, index system 101 may also be configured to backup, version, or otherwise protect the contents of database nodes 102-104. As part of such a process, data within each of nodes 102-104 may be scanned in order for data deduplication to be performed since the same data items may exist across multiple nodes and it is inefficient to store those data items more than once for backup purposes. Given that scanning is already performed for deduplication, the additional processing resources needed to perform the remaining limitations of method 200 are relatively negligible.

As alluded to above, while index system 101 is scanning, method 200 provides index system 101 indexing the data items into an index of partition groups (202). In this example, the three partition groups 131-133 are indexed with one of database nodes 102-104 and index system 101 assigns as the owner of a particular partition group even though each of database nodes 102-104 is an owner of the data items therein. Specifically, partition group 131 includes data 121 and is owned by database node 102, partition group 132 includes data 122 and is owned by database node 103, and partition group 133 includes data 123 and is owned by database node 104. Moreover, the index may further indicate which of nodes 102-104 also own the data in each partition group. While partition groups 131-133 are shown as blocks for illustrative and conceptual purposes, it should be understood that the index of the data in partition groups 131-133 can take any form, such as a table, linked list, or other type of structure or unstructured data.

After creation of the index, method 200 provides index system 101 storing the index (203). The index may be stored to a storage system within index system 101, within secondary data repository 105, or within some other storage system. For example, the index may be stored in association with a version of database nodes 102-104 that was created at the same time as the index (i.e. the scanning step was performed to both create the version and the index). The index can then be accessed at a later time in the event that one of database nodes 102-104 needs to be restored or the data in one of partition groups 131-132.

In a particular example of method 200 as applied to a Cassandra database, the database maintains sorted string tables (SSTables) to map the data stored in database nodes 102-104. Those tables already include one index of the data in the table. However, the index created above at step 202 may be an additional index created for each SSTable that indexes data in the SSTable based on the partition group in which the data is included. The resource usage cost of creating this additional index for each SSTable is negligible because, as noted above, each SSTable already has data items indexed per row of the table. The index created at step 202 can be done by processing that data items index at step 201 to scan the data items in the SSTable, which may already be performed for the purpose of data deduplication or for some other reason.

Using the partition group index created in step 202, data can be recovered on a partition group basis rather than on a physical database node basis. The index is used to identify data for a specific partition group. For instance, instead of using the normal SSTable index to identify all data on database node 102, the partition group index is used to identify only data 121 that is part of partition group 131. The partition group index may further be used to identify data from additional partition groups that are also stored on database 102. Regardless, when data of a partition group is to be restored onto a database node, the data restoration system (which may be index system 101) takes the data items identified from the partition group index for the partition group and fetches those data items from storage (e.g. from a secondary storage repository). Those data items are then formatted into a format (e.g. recovery file) that can be understood by the database under which database nodes 102-104 is operating. Many database systems support tools that perform such formatting and thereby allows for the direct generation of files in a format in which the database stores. That file can then be used to populate the database node. For example, the data items in data 121 may be identified as being in partition group 131 from the partition group index. Those data items are formatted into a recovery file and the file is used to repopulate database node 102 should database node 102 ever require recovery.

Advantageously, by recovering data on a partition group basis, the data in any particular partition group can be restored to a physical database node in one relatively quick file action. Otherwise, the data items would have to be repopulated individually onto the database node by the database itself, which could take a large amount of time depending on the amount of data items due to the need to replicate each record, go through different layers, network delay etc. Additionally, the restoration examples above refer to the restoration of data to a database node in a production cluster of nodes (e.g. database nodes 102-104). However, the partition group index could be used in isolation from the production node cluster since, once the recovery file is generated that file simply needs to be placed in the desired location whether or not the location is in the production cluster. In this way, the production cluster will continue processing requests for other data item tables and will not get affected due to recovery of a particular data item table onto an independent node.

The latter example above allows for efficiency in recovering data collected from the original cluster to a different sized cluster, as may be the case when a user, or user group (e.g. business team), wants to recover data from production cluster and want to perform some specific job on the data. For example, if an analytical team wants to run some experiment on production data backed up at a particular time. The embodiments above allow the team to use an experimental cluster, not the production cluster, to experiment on that backed up data. More specifically, they allow the team to quickly load data into the experimental cluster, perform the experiment, and then release the cluster, which is advantageous since that cycle will happen many times for experimentation. Users can easily create a partition mapping (partition cluster to actual nodes) and, using the partition group index, efficiently create the database files. An assumption is that the database will expect partition mapping information from the user, which databases like Cassandra do.

Using computing environment 100 as an example, database nodes 102-104 comprise the production cluster of a database consistent with the embodiments above. If a user wanted to experiment on a backup of data 121-123 in an experimental cluster, that user may user two database nodes to instantiate the experimental cluster, as opposed to the three nodes that comprise the production cluster. A first of the two nodes may instantiated with data 121 from partition group 131 and data 122 from partition group 132 while the second of the two nodes includes only data 123 from partition group 133. The data for each partition group is therefore only maintained on one of the two nodes in the experimental cluster, which will only be used for the experiment and will be relatively short lived.

FIG. 3 illustrates method 300 of computing environment 100 for performing on-the-fly deduplication during movement of NoSQL data. In particular, method 300 describes in more generic terms how index system 101 can deduplicate data while concurrently indexing the data. Since deduplication of data conserves storage space by storing a single copy of a duplicated data item, deduplication is a common operation performed when storing data, whether that data is being stored in a versioning process or otherwise. Performing the deduplication at the same time as the indexing of method 200 allows index system 101 to conserve processing resources by only needing to scan data 121-123 once.

Method 300 provides index system 101 identifying data items from data 121-123 during scanning step 201 of method 200 (step 301). The data items may be any type of information that is capable of being stored in a file, such as table entries, records, media, and the like, and each file may contain any number of data items. The data items may comprise all of the data items stored in data 121-123 or may be only a portion of the data items stored in data 121-123. For example, if the data items in data 121-123 are being protected (e.g. backed up), then the data items may comprise only data items that have changed since a previous backup.

Method 300 further provides index system 101 identifying duplicate data items from the first data items (step 302). The duplicate data items may be identified by comparing each of the data items against other ones of the data items, by comparing hashes of each of the data items against hashes of the other ones of the data items, or by some other means of identifying duplicate data items.

Once duplicate data items are identified, method 300 provides index system 101 deduplicating and repackaging each of the duplicate data items into respective deduplicated data units (step 303). Each deduplicated data unit comprises a data form that at least contains both a single instance of the deduplicated data item and information describing the multiple locations (e.g. particular files, position within files, etc.) from which the deduplicated data item originated in data 121-123. The information can then be used should the deduplicated data item need to be restored, or otherwise, accessed from secondary repository in one of its original file locations in files 1-N.

After generating the deduplicated data units, data transfer system 102 transfers the deduplicated data units to secondary data repository 105 (step 304). Other unique, non-deduplicated data items of the identified data items are also transferred to secondary data repository 105. In some cases, the both the unique data items and the deduplicated data units are organized into a file and that file is what is transferred to secondary data repository 103. Each deduplicated data unit may include one or more deduplicated data items.

FIG. 4 illustrates operation 400 of computing environment 100 for creating a deduplicated data unit. In operation 400, 12 data items have been extracted from data 121-123 with 10 of those data items being unique. In one example, the 12 data items are identified during scanning phase of method 200 (i.e., step 201) so that the processing resources used during the scanning phase can index data items as well as identify duplicate data items for the purposes of operation 400. For example, if data 121-123 are files in a Cassandra database, then each of data 121-123 are parsed to extract the 10 individual items. Each file may correspond to and include only 1 data item, although, files in Cassandra can include multiple data items. Thus, it is possible for a single file to include all the data items in FIG. 4. Alternatively, if files 1-N are part of a Mongo database, then the data items within two or more files may all be identical at substantially the same time (e.g. even if at one instant one of the files has more or less data items, the other file(s) will eventually catch up). In these cases where files and data items therein are identical, the deduplication process need only look at whether the files themselves are identical to determine that the data items therein are also identical.

At step 1, duplicate data items within the 12 extracted data items are identified. In this example, there are three duplicate instances of data item 2. These duplicate instances may be from the same file or may be from different files. Likewise, the multiple instances of data item 2 may be stored across multiple nodes of a data store (e.g., across database nodes 102-104). Thus, information regarding duplicate item 2 is exchanged among the data store nodes to determine whether the degree of duplicates reaches a predefined consistency level. That is, if the duplicates do not reach the predefined consistency level, then they are not deduplicated for the current version. Those duplicates become the leftover for the next version to deduplicate. If more duplicates appear in the next version so that the total number of duplicates reaches the redefined consistency level, the data will deduplicate in the next version. In contrast, if the consistency level is met, then the operation continues as follows. To distribute the work need to determine the degree of duplicates, data may be partitioned based on keys and each data store node may be owners of one or more partitions. Collecting copies of the same data items (e.g. data item 2) is performed to determine whether enough copies are present in the database to warrant deduplication. That is, the resources needed to transfer and store the number of copies in secondary data repository 105 are balanced with the time and resources needed to deduplicate those duplicate data items.

Should the number of duplicate data items 2 be enough to warrant deduplication in the current version, step 2 repackages the deduplicated data items into a deduplicated data form. Specifically, found duplicates are removed and re-organize the remaining unique data items into file 402, which includes the remaining unique data items and any information needed to restore each copy of item 2. In other examples, the unique data items may be organized into more than one file. For a Cassandra database, step 2 repackages the remaining unique items (e.g. deduplicated items 1 and 3-10 along with deduplicated item 2) into SSTables. A Mongo database does not require similar repackaging after deduplicating a data item. Once the items have been packaged into file 402, file 402 is transferred to and stored in secondary data repository 105 at step 3. In some cases, file 402 comprises a data version, such as the data version of the indexed data discussed above in method 200.

Advantageously, the technology described above allows data 121-123 to be scanned once and produce two outputs that rely on that scanning. That is, data 121-123 is scanned to create an index and to deduplicate data items therein. The timing of the scanning described herein allows a single scan to satisfy the needs of both index creation and deduplication of data items rather than scanning data 121-123 separately for each output.

Referring back to FIG. 1, index system 101 comprises a computer system and communication interface. Index system 101 may also include other components such as a router, server, data storage system, and power supply. Index system 101 may reside in a single device or may be distributed across multiple devices. Index system 101 could be an application server(s), a personal workstation, or some other network capable computing system—including combinations thereof. While shown separately, all or portions of index system 101 could be integrated with the components of at least one of database nodes 102-104.

Database nodes 102-104 each comprise one or more data storage systems having one or more non-transitory storage medium, such as a disk drive, flash drive, magnetic tape, data storage circuitry, or some other memory apparatus. The data storage systems may also include other components such as processing circuitry, a network communication interface, a router, server, data storage system, user interface and power supply. The data storage systems may reside in a single device or may be distributed across multiple devices.

Secondary data repository 105 comprises one or more data storage systems having one or more non-transitory storage medium, such as a disk drive, flash drive, magnetic tape, data storage circuitry, or some other memory apparatus. The data storage systems may also include other components such as processing circuitry, a network communication interface, a router, server, data storage system, and power supply. The data storage systems may reside in a single device or may be distributed across multiple devices.

Communication links 111-114 could be internal system busses or use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-114 could be direct links or may include intermediate networks, systems, or devices.

Figure 5:
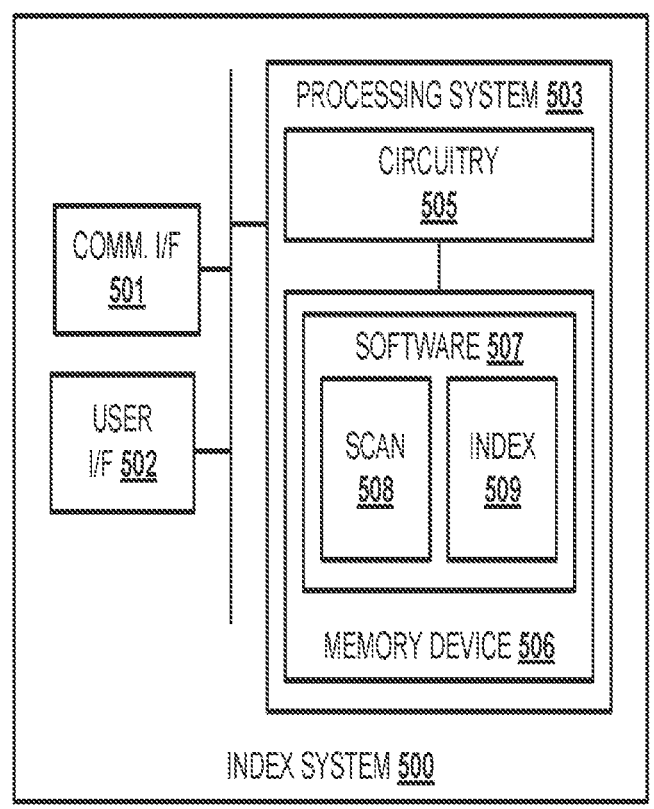
FIG. 5 illustrates an index system for sub-cluster recovery using a partition group index.

FIG. 5 illustrates index system 500. Index system 500 is an example of index system 101, although system 101 may use alternative configurations. Index system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes scan module 508 and index module 509. Operating software 507 may further include an operating system, utilities, drivers, network interfaces, applications, or some other type of software. When executed by circuitry 505, operating software 507 directs processing system 503 to operate index system 500 as described herein.

In particular, scan module 508 directs processing system 503 to scan data items in a plurality of nodes. While scanning, index module 509 directs processing system 503 to index the data items into an index of a plurality of partition groups. Each partition group comprises data items owned by a particular one of the plurality of storage nodes. Index module 509 further directs processing system 503 to store the index.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
creating a partition group index that performs an indexing of a set of data items into a plurality of partition groups;
deduplicating, concurrently with the indexing, the set of data items stored in a node of a plurality of nodes into a set of deduplicated data items comprising singular copies of each data item of the set of data items, wherein a partition group of the plurality of partition groups corresponds to a node of a first plurality of nodes and comprises a subset of data items of the set of deduplicated data items stored in the node;
formatting the set of deduplicated data items into a recovery file in accordance with the partition group index; and
loading the set of deduplicated data items included in the recovery file onto a second plurality of nodes that are configured to restore the set of deduplicated data items in accordance with the partition group index.

2. The method of claim 1, further comprising:
recovering the plurality of nodes by:
identifying the set of deduplicated data items stored in the node based on mappings between the plurality of partition groups and the first plurality of nodes; and
loading the set of deduplicated data items onto the node.

3. The method of claim 1, wherein a deduplicated data item of the set of deduplicated data items comprises a data form that includes a single instance of the deduplicated data item and an indication of one or more original file locations associated with the deduplicated data item, the method further comprising:
accessing the one or more original file locations for recovery based at least in part on the data form of the deduplicated data item.

4. The method of claim 1, further comprising:
generating per node data for each node one or more nodes of the second plurality of nodes based at least in part on mappings between the plurality of partition groups and the first plurality of nodes.

5. The method of claim 1, wherein the second plurality of nodes include fewer nodes than the first plurality of nodes, the method further comprising:
generating a partition group-to-node mapping for the second plurality of nodes from the partition group index.

6. The method of claim 1, wherein deduplicating the set of data items comprises:
identifying one or more duplicate data items of the set of data items;
deduplicating the one or more duplicate data items;
repackaging the one or more duplicate data items into the set of deduplicated data items; and storing the set of deduplicated data items to a secondary data repository.

7. The method of claim 6, further comprising:
determining a degree of duplicates of the set of data items; and
comparing the degree of duplicates to a threshold level of consistency, wherein deduplication is performed responsive to the degree of duplicates being greater than the threshold level of consistency.

8. The method of claim 6, wherein storing the set of deduplicated data items comprises storing a data version of the set of data items, the method further comprising:
compiling the set of deduplicated data items into the data version of the set of data items.

9. The method of claim 6, wherein repackaging the one or more duplicate data items comprises:
storing the set of deduplicated data items into a data file for storage in the secondary data repository.

10. The method of claim 1, wherein the plurality of partition groups include the set of deduplicated data items.

11. The method of claim 1, wherein the set of deduplicated data items are stored in a not only structured query language (NoSQL) data store.

12. The method of claim 1, further comprising:
scanning the set of data items stored in the first plurality of nodes, the first plurality of nodes comprising a first cluster of nodes; and
creating the partition group index while scanning the set of data items, wherein the deduplication occurs concurrently with the scanning.

13. The method of claim 1, further comprising:
storing the partition group index;
identifying the set of deduplicated data items included in the plurality of partition groups in accordance with the partition group index; and
instantiating a second cluster of nodes using the second plurality of nodes based at least in part on the partition group index.

14. An apparatus comprising:
at least one processor;
at least one memory coupled with the at least one processor; and
instructions stored in the at least one memory and executable by the at least one processor to cause the apparatus to:
create a partition group index that performs an indexing of a set of data items into a plurality of partition groups;
deduplicate, concurrently with the indexing, the set of data items stored in a node of a plurality of nodes into a set of deduplicated data items comprising singular copies of each data item of the set of data items, wherein a partition group of the plurality of partition groups corresponds to a node of a first plurality of nodes and comprises a subset of data items of the set of deduplicated data items of the set of deduplicated data items stored in the node;
format the set of deduplicated data items into a recovery file in accordance with the partition group index; and
load the set of deduplicated data items included in the recovery file onto a second plurality of nodes that are configured to restore the set of deduplicated data items in accordance with the partition group index.

15. The apparatus of claim 14, wherein the instructions are further executable by the at least one processor to cause the apparatus to:
recover the plurality of nodes by:
identifying the set of deduplicated data items stored in the node based on mappings between the plurality of partition groups and the first plurality of nodes; and
loading the set of deduplicated data items onto the node.

16. The apparatus of claim 15, wherein a deduplicated data item of the set of deduplicated data items comprises a data form that includes a single instance of the deduplicated data item and an indication of one or more original file locations associated with the deduplicated data item, wherein the instructions are further executable by the at least one processor to cause the apparatus to:
access the one or more original file locations for recovery based at least in part on the data form of the deduplicated data item.

17. The apparatus of claim 14, wherein the instructions are further executable by the at least one processor to cause the apparatus to:
generate per node data for each node one or more nodes of the second plurality of nodes based at least in part on mappings between the plurality of partition groups and the first plurality of nodes.

18. The apparatus of claim 14, wherein the instructions are further executable by the at least one processor to cause the apparatus to:
identify one or more duplicate data items of the set of data items;
deduplicate the one or more duplicate data items;
repackage the one or more duplicate data items into the set of deduplicated data items; and
store the set of deduplicated data items to a secondary data repository.

19. The apparatus of claim 18, wherein the instructions are further executable by the at least one processor to cause the apparatus to:
determine a degree of duplicates of the set of data items; and
compare the degree of duplicates to a threshold level of consistency, wherein deduplication is performed responsive to the degree of duplicates being greater than the threshold level of consistency.

20. A non-transitory computer-readable medium storing code, the code comprising instructions executable by at least one processor to:
create a partition group index that performs an indexing of a set of data items into a plurality of partition groups;
deduplicate, concurrently with the indexing, the set of data items stored in a node of a plurality of nodes into a set of deduplicated data items comprising singular copies of each data item of the set of data items, wherein a partition group of the plurality of partition groups corresponds to a node of a first plurality of nodes and comprises a subset of data items of the set of deduplicated data items stored in the node;
format the set of deduplicated data items into a recovery file in accordance with the partition group index; and
load the set of deduplicated data items included in the recovery file onto a second plurality of nodes that are configured to restore the set of deduplicated data items in accordance with the partition group index.

\* \* \* \* \*